Feb. 5, 1935. C. SCHENK 1,989,826
AIRPLANE TURN AND BANK INDICATOR AND ARTIFICIAL HORIZON
Filed June 15, 1932 2 Sheets-Sheet 2
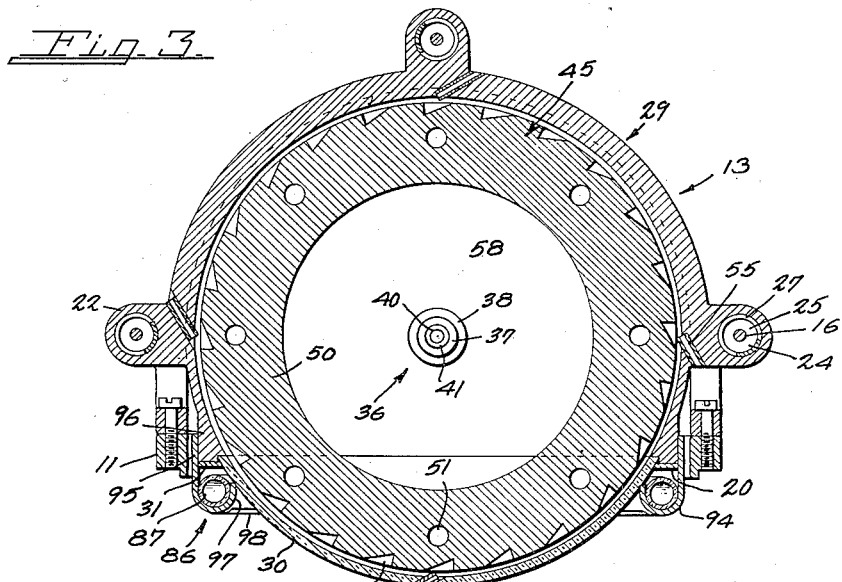
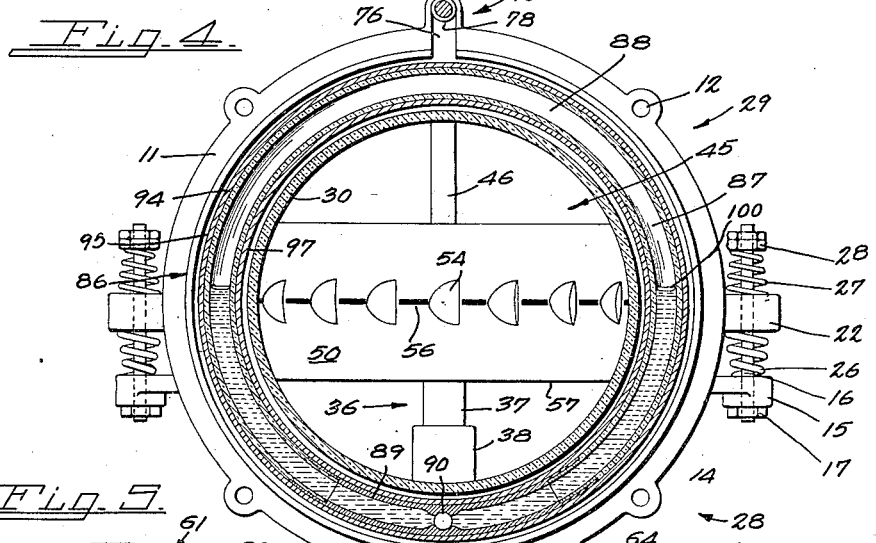
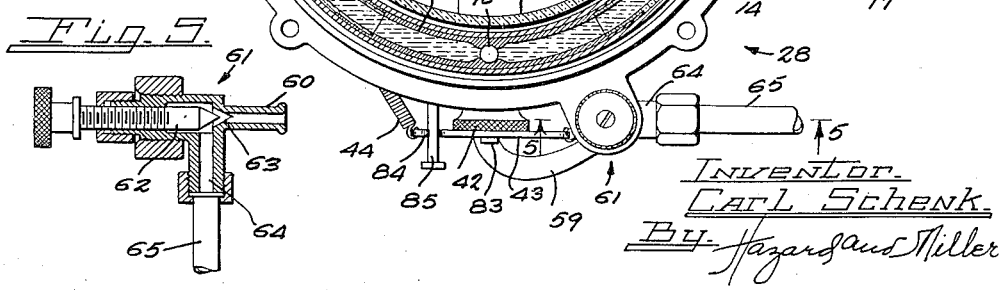
Inventor
Carl Schenk.
By Hazard and Miller
Attorneys.

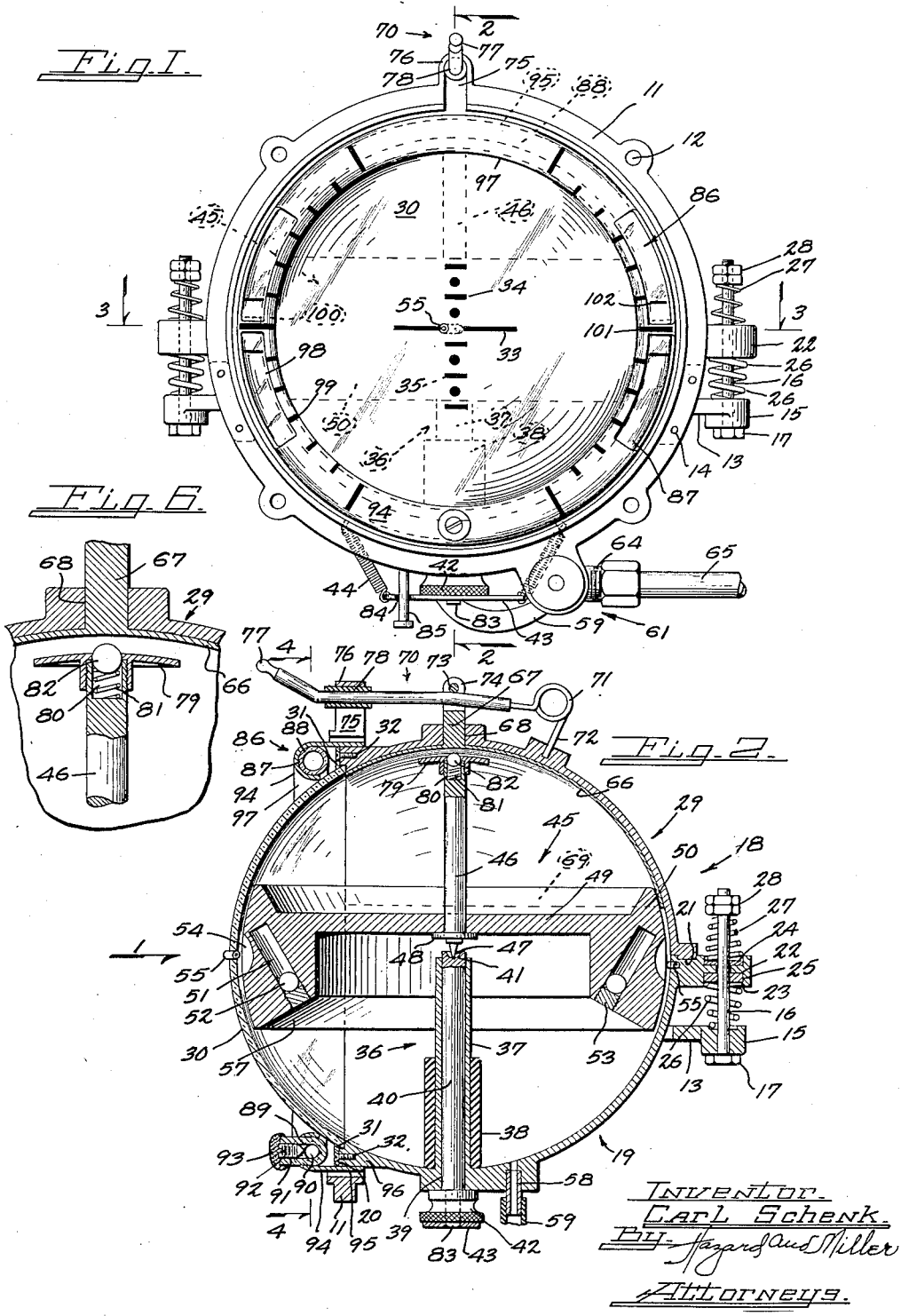

Patented Feb. 5, 1935

1,989,826

UNITED STATES PATENT OFFICE 1,989,826

AIRPLANE TURN AND BANK INDICATOR AND ARTIFICIAL HORIZON

Carl Schenk, Los Angeles, Calif.

Application June 15, 1932, Serial No. 617,389

15 Claims. (Cl. 33—204)

My invention relates to a gyroscopic device for giving an artificial horizon which may be used for determining turns and banks of airplanes in which the gyroscope is rotated by air suction through the action of the vacuum of the engine or other suitable source.

In my invention, one of my objects and features is to have the artificial horizon formed by a line or the like on the rotor of the gyroscope, which line would normally be horizontal and, hence, retain such horizontal position during a bank or climbing or descending of the airplane. In order to define such horizontal line more accurately, the gyroscope is mounted with the periphery of the rotor facing the pilot, and a cover glass is domed to conform to the spherical shape of the periphery of the rotor. This glass is marked with a line to indicate the normal horizontal, and with other lines to indicate departures from the horizontal in climbing or descending and in making banks for turns or the like.

Another object and feature of my invention is a construction for instantly steadying the rotor of the gyroscope should this, for any reason, start to oscillate. A type of rotor used in my invention is one in which a heavy ring is mounted on a spindle having a spinning point moving in a cup and by my construction for stopping the oscillation comprises an upward extension of the spindle with the partly spherical hood which may be manually pressed downwardly to engage with the upper end of the spindle and thereby stop the oscillation. In order to effect this in a delicate manner without materially interfering with the rotation of the gyroscope, the spindle is provided with a spring mounted ball at the top which may be engaged by the partial sphere.

Another object and feature of my invention comprises a brake which may be applied manually to the gyroscope to stop the rotation. This utilizes the same partly spherical hood, which may be forced downwardly to engage a disk on the upper end of the spindle, this disk having a partly spherical surface, these spherical surfaces being concentric with the spinning point of the spindle in its bearing.

Another feature of my invention relates to an automatically acting brake arranged to stop the rotation of the rotor when the airplane tilts to such a degree that the rotor cannot properly rotate. This is done by bringing the lower surface of the rotor into contact with a rubber collar on a sleeve which encloses the stem for the bearing of the rotor. This brings the rotor to rest should the airplane turn upside down as in forming a loop, rolling, or other maneuvers.

Another feature of my invention relates to the construction by which the spinner of the spindle can never leave its cup-shaped bearing on the bearing stem. This is accomplished by the use of the partly spherical hood, which allows a certain play between the spinner end of the spindle and its upper end and the bearing.

Another object and feature of my invention is the provision of means whereby the rotor cannot receive a severe jar due to "bumps" in the air, and for this purpose the bearing for the spinner of the spindle is mounted in a cup on a retractible stem, which stem is spring supported. Therefore, in bumpy flying the springs may be extended and relieve the shock of the rotor on the spinner and bearing. By releasing the spring the stem with its bearing may be removed for cleaning and oiling. In addition to this, the whole instrument is spring supported in a frame, which frame can be attached to the instrument board of an airplane.

A further feature of my invention relates to the positioning of movable weights in the rotor which may move upwardly and outwardly by centrifugal force during the rotation of the rotor and thus raise the center of gravity to bring this approximately to the same level as the bearing of the spinner of the spindle to make the instrument more sensitive. This feature is claimed in my copending application Serial Number 390,393, filed Sept. 4, 1929.

Another feature of my invention relates to the use of a fluid level indicator surrounding the observation domed glass housing the gyroscope. This is made in a continuous ring and at the lower end there is a contracted portion with a control valve so that the oscillation of the fluid may be damped.

My invention is illustrated in the accompanying drawings, in which:

Fig. 1 is a front elevation taken in the direction of the arrow 1 of Fig. 2.

Fig. 2 is a vertical section on the line 2—2 of Fig. 1 in the direction of the arrows.

Fig. 3 is a horizontal section on the line 3—3 of Fig. 1 in the direction of the arrows.

Fig. 4 is a vertical section on the line 4—4 of Fig. 2 in the direction of the arrows.

Fig. 5 is a detailed section on the line 5—5 of Fig. 4 showing the suction control valve.

Fig. 6 is an enlarged detail of the upper end of the spindle shown in section in Fig. 2.

In constructing my invention I utilize a vertical supporting ring 11 which has eyes 12 for attachment to an instrument panel or the like. The ring 11 has substantially a semi-circular horizontal ring 13 attached thereto. This is secured by attaching screws 14 and extends around the back of the housing hereinunder described. The ring 13 has a series of lugs 15, three of these being illustrated, and to each of these lugs there is secured a bolt 16, the bolt being threaded in the lug and having a lock nut 17.

The main housing 18 has a lower section 19 which is formed of a spherical curvature and is greater than a quarter sphere, terminating at the face 20 at the front and at the horizontal joint 21. This lower section of the housing has three lugs 22, each of which is perforated, the bolt 16 passing through the perforation. The lug 22 is provided with lower and upper recesses 23 and 24, each of which carries a felt packing washer, the washers being designated as 25. A coiled compression spring 26 fits between the washer in the lower socket and a seat in the lug 15 in the frame 13, and an upper compression spring 27 bears against the washer on the upper seat and nuts 28 threaded on the upper end of the bolt. This construction gives a spring suspension support for the housing in the ring-like frame 11 and its horizontal section 13. The lower spring is of greater strength than the upper. The housing is completed by an upper section 29 which also has a spherical curvature and has a horizontal seat bearing on the horizontal joint 21 and terminates at the front face 20.

In order to complete a covering for the housing, a glass cover 30 formed on the spherical curvature is attached to the face 20 by means of a clamping ring 31 having clamping screws 32 holding this in place. The glass is marked with a horizontal line 33 to indicate the normal horizon and has upper and lower marks 34 and 35 to indicate degrees of inclination when the airplane is rising or descending, these being used in connection with a line on the rotor of the gyroscope.

The journal or bearing of the gyroscope designated generally as 36 employs a sleeve 37 which is formed integral with the lower section 19 of the housing. Surrounding this sleeve there is a rubber collar 38. A perforation 39 through the bottom of the section 19 allows insertion and removal of the stem 40. This stem has a cup bearing 41 at the top, the upper edge of the bearing extending slightly above the top of the collar 37. At the bottom the stem is provided with a knob 42 and transverse to this knob there is a strap 43. Springs 44 are attached to the strap and secured to the underside of the housing section 19. These springs give a resilient support for the stem 40.

The rotor designated 45 has a central spindle 46 with a pointed spinner 47 at the bottom, there being a shoulder 48. A substantial horizontal web 49 extends from the spindle and has a heavy weighted peripheral section 50. In this peripheral section there are a series of upwardly and outwardly inclined sockets 51, in each of which there is a weight, such as a ball 52, the lower ends being closed by plugs 53. The peripheral surface of the rotor is spherical in curvature with the center being the center of rotation of the spinner in the bearing. This periphery has a series of driving blades or buckets 54. These are inclined to receive impinging air passing through nozzles 55, three of which are illustrated as mounted in the lower section of the housing adjacent the lugs 22, and one nozzle extends through the glass lens. The rotor, in addition, has a horizontal marking line 56, this to define the horizon. The lower surface 57 of the rotor is inclined so that when the rotor is tilted at a decided angle, this surface will contact with the rubber collar 38 which acts as a brake and stops the rotation of the rotor.

The suction for rotating the rotor employs an outlet 58 from the lower portion of the housing 19. A flexible hose 59 is carried to a nipple 60 of a valve 61. This valve is illustrated as having a needle point 62 bearing on the seat 63 (note Fig. 5). A second nipple 64 has a pipe 65 connected thereto which may lead to a source of suction, such as the intake manifold of the engine.

The mechanism for reducing oscillation of the rotor is by means of a hood 66. This hood is spherical-shaped and formed with thin metal. It fits in the upper section 29 of the housing 18 and has a depressing and elevating shank 67 which extends through a perforation 68 in the top of the housing section 29. The hood terminates in the front at the marginal edge of the lens and at the bottom has a horizontal edge 69 which is slightly below the upper edge of the rotor when this is in a horizontal position.

The means to raise and lower the hood 66 is by means of a lever arm 70, which is illustrated as having a coiled spring 71 toward the anchor end 72, which end is secured to a lug or the like on the exterior of the housing section 29. The lever fits underneath a pin 73 between a yoke 74 on the end of the lug 67. The outer end of the lever passes through a slot 75 formed in an upwardly extending section 76 of the ring 11. This lever has a finger grip end 77 and is provided with a rubber collar 78 to have a resilient action in the slot 75.

The upper end of the spindle 46 is provided with a small disk 79. This is formed dome-shaped concentric with the hood 66 of the interior of the housing 18. A socket 80 is formed in the end of the spindle and in this socket there is a compression spring 81 which presses a ball 72 normally outwardly, this ball being held in place by the disk 79.

The operation of the oscillation damping device is as follows:

Should the gyroscope rotor oscillate during its rotation, the lever 70 may be depressed slightly to bring the hood 66 into contact with the ball 82. This gives a frictional resistance to the oscillation of the rotor and brings the rotor to its condition of rotating at a high speed without oscillation. If it is desired to completely stop the rotation of the rotor, the lever 70 may be depressed still further to bring the hood 66 into engagement with the disk 79, which action brings relatively large braking surfaces into contact, these being the disks 79 and the inside of the hood 66. If it is found that a still further pressure is necessary to stop the rotation of the rotor, the further downward movement of the lever 70 forces the spindle 46 down and thrusts the stem 40 outwardly against the action of the springs 44. This brings the shoulder 48 into contact with the upper end of the collar 37, giving a frictional action.

This latter braking action sometimes comes into action if the airplane lands heavily, in which case the springs 44 are tensioned. Normally these springs allow a slight depression of the stem 40 and thus give a resilient mounting for the rotor so that the bearing 47 is not normally injured. However, if the landing is excessively heavy the depression of the stem 40 is sufficient to bring the shoulder 48 into engagement with the upper end of the collar 47 and stop rotation of the rotor.

In order to steady the action of the strap 43, which is loosely connected to the projecting end 83 of the stem 40, a notch 84 is formed in this strap and in this notch there fits a pin 85, which pin projects downwardly from the lower section 19 of the housing 18. When it is desired to remove the strap for removal of the stem 40 the strap may be rotated on the end 83 to release this from the pin 85. The springs may then be disconnected and the stem with its bearing removed from the housing of the gyroscope.

In addition to the gyroscopic level I employ a liquid level 86. This employs a circular tube 87, the upper part 88 of which is preferably made of glass and the lower part 89 of metal. The portion 89 has a contracted valve section 90 with a short internally threaded tube 91 connected thereto. In this portion there is threaded a valve stem 92. This is to restrict the flow of fluid from one side to the other to prevent excessive oscillation. When the stem 92 is adjusted, it is secured by a seal 93 to prevent tampering with the adjustment. This circular tube may be supported on the gyroscope housing in any suitable manner. The construction illustrated employs a circular sheet metal ring 94. This has a flange 95 which fits inside of the ring 11 on a cylindrical surface 96 at the forward end of the lower and upper sections 19 and 29 of the housing 18. This ring is secured in any suitable manner. The ring has an inwardly curved section 97 and has cutout portions 98 to allow observation of the liquid level. There are graduations 99 marked on this ring which indicate the degree of bank or tilt of the airplane by means of the horizontal line 33 of the gyroscope rotor. These marking lines also indicate a tilt due to the liquid level seeking equal height on both sides. The surface 100 of the liquid level is designed to be but slightly above the normal horizontal mark 101 on the ring 94 containing the liquid tube.

The various marks and lines on the lens and on the casing for the liquid level tube are preferably made with a radium type paint to be visible in the dark, also the case behind the glass at substantially the normal horizontal level is covered with a radium paint indicated at 102. This shows the normal liquid level when the airplane is on an even keel or when it is making a correct bank in turning, also in rising and descending on an even keel.

The liquid level functions in cooperation with the gyroscope. This liquid occupies the horizontal or central position shown in Figs. 1 and 4, as above mentioned, when the airplane is on an even keel and not skidding. However, should the plane skid sideways, while the gyroscope rotor will maintain a horizontal position, the liquid will be thrown to one side due to the action of the skid, and show an uneven movement of the airplane. As the plane makes a correct bank the component of the gravitational and centrifugal force will hold the liquid level in the same position as when the airplane is flying correctly on an even keel.

I find it is advisable to have the driving blades or buckets 54 an odd number so that with the evenly positioned air nozzles 55, all of these nozzles cannot simultaneously be ejecting air at the same place in different blades or buckets and, therefore, there is less liability of the rotor setting up a vibration due to what might be considered its natural period of vibration. This construction, in using an odd number of buckets, therefore causes the ejecting propelling air to strike the different buckets while these are in slightly different positions relative one to the other.

Various changes may be made in the details of construction without departing from the spirit or scope of the invention as defined by the appended claims.

I claim:

1. An artificial horizon instrument having an enclosing housing with a cover glass on one side, such glass being spherical in shape, the glass having a horizontal line at its center and marks above and below said line to indicate inclinations, a structure having marks thereon adjacent the periphery of the glass to indicate angles of tilt, a gyroscope rotor having a heavy rotating body with a spherical periphery, a line on said periphery to indicate an artificial horizon, and means to rotate said rotor, the portion of the housing additional to the glass being substantially spherical on its inner surface, a spindle extending upwardly from the rotor, and a brake applying hood mounted in the additional portion of the housing and movable to engage said spindle only.

2. An artificial horizon instrument having a housing with a cover glass on one side formed with a surface as part of a sphere and having marks thereon to indicate a horizontal and inclinations above and below the horizontal, a bearing in the housing at substantially the center of the sphere, a spindle having a spinner mounted in the bearing with a gyroscope rotor attached to the spindle, said spindle extending above the rotor, said rotor having a line on its periphery to indicate an artificial horizon, a hood vertically movable in the housing, said hood being spherical on its inner surface and adapted to engage the upper part of the spindle to stop oscillation of the rotor or to act as a brake on the rotor.

3. An artificial horizon instrument as claimed in claim 2, the upper end of the spindle having a ball resiliently mounted therein, said ball being adapted to be engaged by said hood.

4. An artificial horizon instrument as claimed in claim 2, the spindle having a ball mounted on a spring at its upper portion, and a disk having a spherical surface, said hood being adapted when depressed to first engage the ball and on depression of the ball to engage said disk, the hood and the disk operating to form a brake to stop the rotation of the rotor.

5. An artificial horizon instrument having a housing with a cover glass on one side, said glass being formed with a surface as part of a sphere and having lines to indicate a horizontal and inclinations above and below the horizontal, a stem extending upwardly from the bottom of the housing and having a bearing at the top, a spindle with a spinner mounted in the bearing, a rotor mounted on the spindle and having a heavy peripheral body with a line on said body to indicate an artificial horizon, said stem being resiliently mounted to depress slightly due to a vertical shock of the gyroscope rotor on the bearing, said spindle extending upwardly above the rotor, a hood movably mounted in said housing and adapted to be depressed to engage the upper part of the spindle and to depress the spindle and the stem.

6. An artificial horizon instrument having a housing, a stem mounted therein having a cup-shaped bearing, a spindle having a spinner operating in said bearing, a heavy rotor secured to the spindle, the stem being resiliently mounted to allow depression due to shocks to the rotor, said spindle extending upwardly above the rotor, a hood with a spherical curvature fitting the upper part of the housing, and means to depress said hood to engage the upper part of the spindle to effect a braking action on such spindle and rotor.

7. An artificial horizon instrument having a housing, a stem mounted therein having a bearing, a spindle having a spinner point operating in said bearing, a heavy gyroscope rotor connected to the spindle, means to rotate the rotor, a hood in the housing having an internal spherical curvature, means to depress the hood to engage the upper part of the stem to operate as a brake to prevent oscillation of the rotor, a spring in the spindle, a ball at upper end of the spindle supported by said spring, the hood when depressed being adapted to engage the ball.

8. An artificial horizon instrument having a housing, a bearing therein, a spindle having a spinner point operating in the bearing, a heavy gyroscope rotor connected to the spindle, the spindle having a disk at the top of a spherical curvature, a hood in the housing spherical-shaped on the inside, means to depress the hood to engage said disk on the spindle and operate as a brake, said disk having an opening, a ball in the spindle projecting partly through said opening, a spring in the spindle supporting said ball whereby on initial depression of the hood such hood contacts first with the ball.

9. An artificial horizon instrument comprising in combination a vertical ring-like frame adapted for attachment to an instrument board in a vertical position, a normally horizontal semi-circular ring attached to the back portion of the vertical ring, a spherical gyroscope housing resiliently mounted in the horizontal semi-circular ring, said housing having a sleeve extending upwardly from the lower portion with a stem mounted therein and having a bearing at its upper end, the front of the housing being formed of glass, the center of curvature of the spherical housing being substantially the center of the bearing, a spindle having a spinner point operating in the bearing, and a heavy gyroscope rotor mounted on the spindle.

10. An artificial horizon instrument as claimed in claim 9, the spindle extending upwardly above the gyroscope, the upper portion of the spherical housing having a dome shaped hood, means to depress said hood to cause it to contact the upper end of the spindle, the said stem having a resilient support in the sleeve, and said stem being depressed when depressing the spindle.

11. An artificial horizon instrument comprising in combination a vertical ring-like frame adapted for attachment in a vertical position to an instrument board, a normally horizontal semi-circular ring attached thereto extending rearwardly, a spherical housing having a rearward portion greater than a hemisphere and resiliently supported on the semi-circular ring, the front portion of the housing being of glass and completing the sphere, a stem extending upwardly from the lower portion of the housing and having a bearing at the axial center of the housing, a stem having a spinner point operating in the bearing, and a rotor mounted on the stem.

12. An artificial horizon instrument as claimed in claim 11, the rear portion of the housing being formed of upper and lower parts with a joint line substantially on the normally horizontal line, the spindle extending upwardly above the rotor, a dome shaped hood mounted in the upper part of the housing, and means to depress the hood to contact the hood and the upper part of the stem.

13. An artificial horizon instrument having a spherical shaped housing with a front portion less than a hemisphere formed of glass, a stem connected to the lower part of the housing and having a bearing at its upper end, a spinner point mounted in said bearing, a spindle extending upwardly from the spinner point, a rotor secured to the spindle, the top of the spindle being contiguous to the spherical housing, a slidable dome in the upper part of the housing, means to depress said dome to engage the upper part of the spindle, the said spindle and spinner point being in axial alignment to convey the thrust from the dome through the axis of the spindle and spinner point to the bearing.

14. An artificial horizon instrument as claimed in claim 13, the stem having a resilient collar mounted thereon, the lower portion of the rotor being beveled to engage said collar on excess tilting of the rotor, and the said dome being sufficiently large to engage the upper end of the spindle at any degree of tilting of the rotor.

15. An artificial horizon instrument having a spherical shaped housing, the front portion of the housing less than a hemisphere being formed of glass, a sleeve extending upwardly through the housing, a stem mounted in the sleeve, a bearing on the top of the stem, a spinner point in the bearing, a spindle integral with and in axial alignment with the spinner point, a rotor connected to the spindle, the top of the spindle extending above the rotor, a movable dome in the upper part of the housing, means to move said dome to contact the upper end of the spindle, the lower portion of the housing having an opening, the stem extending therethrough, springs secured to the outside of the housing, a strap engaging the springs and detachably connected to the lower part of the stem, the depression of the stem through the medium of the dome being adapted to contact a portion of the rotor and the upper part of the sleeve.

CARL SCHENK.